United States Patent [19]
Bennett

[11] Patent Number: 5,900,014
[45] Date of Patent: May 4, 1999

[54] EXTERNAL MEANS OF OVERRIDING AND CONTROLLING CACHEABILITY ATTRIBUTE OF SELECTED CPU ACCESSES TO MONITOR INSTRUCTION AND DATA STREAMS

[75] Inventor: Brian R. Bennett, Laguna Niguel, Calif.

[73] Assignee: AST Research, Inc., Irvine, Calif.

[21] Appl. No.: 08/769,321

[22] Filed: Dec. 19, 1996

Related U.S. Application Data

[63] Continuation of application No. 08/351,759, Dec. 8, 1994, abandoned.

[51] Int. Cl.$^6$ .............................. G06F 12/08; G06F 11/30
[52] U.S. Cl. .............. 711/138; 395/183.05; 395/183.14; 395/183.15; 395/704; 395/568
[58] Field of Search ...................... 711/138, 139, 711/121, 122; 395/183.15, 183.14, 185.05, 185.06, 185.09, 704, 568, 183.04, 183.05

[56] References Cited

U.S. PATENT DOCUMENTS

| | | | |
|---|---|---|---|
| 4,758,946 | 7/1988 | Shar et al. | 711/206 |
| 4,885,680 | 12/1989 | Anthony et al. | 711/144 |
| 5,075,846 | 12/1991 | Reininger et al. | 364/400 |
| 5,249,281 | 9/1993 | Fuccio et al. | 711/123 |
| 5,325,499 | 6/1994 | Kummer et al. | 711/133 |
| 5,327,545 | 7/1994 | Begun et al. | 711/143 |
| 5,355,467 | 10/1994 | MacWilliams et al. | 711/146 |
| 5,404,464 | 4/1995 | Bennett | 395/281 |
| 5,463,760 | 10/1995 | Hamauchi | 711/3 |
| 5,619,677 | 4/1997 | Nishimukai et al. | 711/138 |
| 5,636,363 | 6/1997 | Bourekas et al. | 711/138 |

FOREIGN PATENT DOCUMENTS 64-002155  1/1989  Japan .

OTHER PUBLICATIONS

*Atmel Travels New Worlds*, Electronic Buyers' News Mar. 14, 1994, p.14.

Case Brian, ARM600 targets low–power applications: ARM core extended with 32–bit addressing, "object oriented" MMU, Microprocessor Report, v5, n23, p8(4), Dec. 18, 1991.

Gallant, Protocols keep data consistent; cache–coherency protocols, EDN, v36, n6, p41(6), Mar. 14, 1991.

Shear, David; Teaming a Logic Analyzer with a Debugger Provides Advantages to Both Tools, EDN–Technology Update, Jan. 20, 1994 pp. 21–26.

*Primary Examiner*—Eddie P. Chan
*Assistant Examiner*—Reginald G. Bragdon
*Attorney, Agent, or Firm*—Knobbe, Martens, Olson & Bear, LLP

[57] ABSTRACT

A system for facilitating debugging of software running within an information processing unit includes an external trigger state machine which selectively overrides the cacheability attribute of a cache line. An in-circuit emulator (ICE), which is used for debugging purposes, monitors addresses read by and written to a CPU. If an address which is of interest for debugging purposes is detected by the ICE, then the ICE issues a trigger signal. The trigger signal causes the external trigger state machine to designate the cache line associated with the detected address as a non-cacheable operation (i.e., to override the cacheability attribute) . Thus, the data associated with the cache line is written out to the main memory module where the data can be observed by an ICE, rather than to an internal cache memory location where the data would be invisible to an ICE. In a preferred embodiment of the invention, the external trigger state machine is configured to operate in a pipelining environment wherein multiple requests may be outstanding at one time.

8 Claims, 4 Drawing Sheets

MULTIPROCESSOR INFORMATION PROCESSING SYSTEM

EXTERNAL MEANS OF OVERRIDING AND CONTROLLING CACHEABILITY ATTRIBUTE OF SELECTED CPU ACCESSES TO MONITOR INSTRUCTION AND DATA STREAMS

This application is a continuation of U.S. patent application Ser. No. 08/351,759, filed Dec. 8, 1994, now abandoned.

BACKGROUND OF THE INVENTION

1. Field of the Invention

The present invention relates to debugging of processing computer systems which include an internal cache wherein not all microprocessor instructions and data can be monitored outside of the microprocessor.

2. Description of the Related Art

Software for information processing devices has become increasingly more complex. Thus, more sophisticated tools are necessary to aid in debugging problems typically encountered when implementing such software. One powerful tool which has been developed is the in-circuit emulator (ICE) which monitors the instruction and data stream into and out of a microprocessor. Typically, an ICE comprises a logic analyzer together with memory which records a data or instruction stream over a predetermined window of time through a data communication channel such as a system bus.

In a typical information processing system, one or more central processing unit (CPU) modules communicate with memory or input/output (I/O) units via a system bus. A typical CPU module includes a CPU having an internal cache memory which communicates with an external cache memory via a bidirectional communications bus. The external cache memory typically communicates with the system bus via a local data bus, a local address bus, and a local control bus.

As is well known in the art, a cache memory is a fast memory storage unit which is under the control of the CPU within each of the CPU modules. A cache memory may be either a write-through cache memory or a write-back (sometimes called copy back) cache memory.

A write-through cache memory always immediately writes data changes within memory locations of the cache to corresponding memory locations within the main memory module. Thus, for example, if the central processing unit within the first CPU module writes new data into the cache memory within the first CPU module at a given address, the cache memory will immediately write the same data into the corresponding address in the main memory module via the multiprocessor bus. It should be noted here that the main memory module will typically have a portion of memory which has a mapped one-to-one correspondence to memory locations within the cache memories of each of the CPU modules. The memory locations within the main memory module that can have corresponding cache memory locations are typically called cacheable memory addresses. At any time, a portion of the cacheable memory addresses are mapped into the cache memories. The mapped portions typically change over time as the CPU modules request data from different portions of the main memory. When changes occur, the data in the cache memories are swapped out and replaced with data from the main memory. It is important that the corresponding memory locations within each of the cache memories and the main memory unit contain the same data because when an input/output device wishes to access a memory location, the memory location will typically be accessed within the main memory unit. However, if the main memory unit does not have the same data as the cache memory of a corresponding address, this indicates that the main memory unit has yet to be updated with the most recent data which is present within the address sought by the input/output device. Thus, erroneous data may be retrieved by the input/output device if the main memory unit does not have the same data as the corresponding cache memory address.

Although write-through cache memories guarantee that corresponding memory locations within the cache memories and the main memory module have the same data, the necessity of immediately accessing the multiprocessor bus each time the CPU within a CPU module writes to the cache memory causes a number of interruptions on the multiprocessor bus. These interruptions often create bus inefficiencies which may severely compromise the performance of the overall multiprocessor system.

To overcome the difficulties associated with write-through cache memories, write-back cache memories have been used. Write-back cache memories write data from the cache memory to a corresponding memory location within the main memory unit at a later time when the data is requested by another device (such as an input/output device or another CPU module). This increases the overall efficiency of the system since the CPU may update data several times within a write-back cache location without writing these updates out to the main memory. Thus, the system bus typically is used less frequently in write-back cache memory systems. Furthermore, the internal cache memory within a CPU may also be write-back so that several data and instruction modifications may be made solely within the CPU before the final product is written out to the external cache memory.

In order to monitor the operation of the CPU for debugging purposes, an ICE may be connected along a data/instruction path such as a system bus, the local data address and control bus from the external cache memory to the system bus, or the bidirectional communication bus between the external cache memory and the CPU. When monitoring the operation of the CPU, the ICE is programmed to recognize a prespecified data sequence. For example, the ICE may be programmed to trigger when a particular data sequence is written to a specified memory address location, or when several data sequences are written in succession to specified memory address locations. As soon as the ICE detects the prespecified data sequence at the given address location or locations, the ICE outputs a record of the entire data and instruction sequence which occurs proximate in time to the specified data sequence which triggered the ICE. In some applications, the ICE will output a record of the data and instruction sequence which follows the specified trigger data sequence within some time window, while in other applications the ICE will output a record of the entire data and instruction sequence which preceded the prespecified data sequence by some time window. In yet other applications, the ICE outputs a record of the data and instruction sequence both before and after the pre-specified trigger data sequence.

The data record output by the ICE can be used for debugging purposes and is therefore highly useful in design and testing of new software applications. A significant difficulty is encountered, however, in systems which incorporate a write-back internal cache so that not all of the microprocessor instructions and data are visible outside of the microprocessor where they can be monitored by the ICE. Data writes to the internal cache of the microprocessor, and data reads from the internal cache of the microprocessor, are essentially invisible because many of the reads and writes are never output to the external cache or to the system bus where these data transfers and instruction signals can be monitored by the ICE. Thus, in microprocessor systems which include an internal cache memory, it becomes very difficult to analyze and debug complex new software.

In order to monitor the instruction and data stream into and out of the internal cache of a microprocessor, some systems simply disable the entire cache memory so that all instruction and data transfers are carried out over the system bus. However, in such implementations, a microprocessor system is typically slowed down considerably, and errors which would normally be produced within a high speed system are often not reproducible when the microprocessor has been slowed down by the disabling of all cache memories.

Other systems have contemplated disabling only the internal cache within the microprocessor. The ICE can then be interposed between the microprocessor and the external cache to monitor all operations executed by the microprocessor. While this does slow down the overall microprocessor system considerably, this effect is somewhat minimized by the fact that the external cache is operable. However, unless the external cache has been designed to allow for a condition wherein the internal cache is disabled, such disabling may constitute an illegal state for the external cache. That is, the external cache memory may not be equipped to handle communications with the microprocessor when the internal cache within the microprocessor is disabled. In such cases, the external cache may, for example, transmit an entire cache line to the microprocessor when the microprocessor only expects a single data block since it is in the cache disable mode. In such instances, the performance of the microprocessor system may be severely compromised.

A third approach is to use a special "bond-out" microprocessor in the ICE. Such chips include special output terminals which may be used to monitor the operation of the internal cache memory within a microprocessor. This bond-out allows the ICE access to some internal signal lines that may enable more accurate monitoring of the system. However, such chips are quite expensive and generally not available for all microprocessor types.

A fourth approach is to have the operating system map different areas of memory as non-cacheable. However, with this approach, the resolution of the memory management unit (MMU) in the microprocessor is such that it would generally require an entire page of memory for the operating system to map different areas of memory as non-cacheable. For example, for an 80486, an entire 4 kilobyte page of memory would be required for the operating system to map these areas of memory as non-cacheable. Also, such memory mapping requires intimate knowledge of the operating system kernel and access to the source code.

Finally, several microprocessors have internal registers that can be used for debugging. Such registers allow the debugging engineer to specify an event which will cause the microprocessor to take a "debug" exception. That is, the microprocessor would trigger when, for example, a specified address and/or data pattern is observed. However, since the internal registers within the microprocessor are generally small, this technique often allows monitoring of only one to six addresses or break (i.e., trigger) points. Therefore, more complex patterns which might be required to properly debug a complex software program would not be observable using such devices. Additionally, since none of the activity is visible by the ICE, a debugging engineer is often left to guess which section of code actually caused the trigger. Furthermore, the specified events which trigger the break points are typically simple and do not allow for more complicated trigger options that are typically necessary for complex software implementations and are typically available with an external logic analyzer.

SUMMARY OF THE INVENTION

The present invention facilitates the debugging of complex software problems by making certain memory locations visible to an external ICE or logic analyzer. As detailed above, current methods generally operate with the cache disabled which so severely changes the system characteristics that often a failure observed at a higher clock rate will disappear at the slowed down clock rate. Alternatively, a problem which occurs in an interval of several hours may occur much less frequently, perhaps once over several days. By selectively making only a few memory locations non-cacheable, the system of the present invention operates at near normal speeds while allowing complete visibility for the selected addressing range.

The use of an external trigger (generally within a logic analyzer) provides the ability to unintrusively select different cacheability ranges without burdening each processor module with additional logic. Additionally, this means that monitoring or changing the system addresses eliminates the need to modify system software which can take time, and often the entire kernel of the operating system may have to be recompiled to make changes (i.e., in the case where the operating system is used to disable the cacheability of the memory) . As software development becomes more complex, debugging efforts require more and more of product design time. Better tools such as the present invention will shorten the product development time.

According to one embodiment, the present invention provides an apparatus for controlling a cacheability attribute of a central processing unit (CPU) access within an information processing system. The information processing unit includes a CPU having an internal cache memory and an external memory module which exchanges data with the CPU. A cacheability attribute is associated with the data and designates the data as cacheable or non-cacheable. The apparatus comprises at least one data monitoring unit in communication with the CPU to monitor signals issued and received by the CPU. The data monitoring circuit outputs a trigger signal upon detecting a data operation which is to have the cacheability attribute modified. The apparatus further comprises a cacheability attribute modify circuit. The cacheability attribute modify circuit receives input from the data monitoring unit so that, upon receiving the trigger signal from the data monitoring circuit, the circuit modifies the cacheability attribute associated with the data operation.

In a preferred embodiment, the cacheability attribute modify circuit changes the cacheability attribute associated with the data operation so as to designate a cacheable data operation as a non-cacheable data operation upon reception of the trigger signal.

In another preferred embodiment, the cacheability attribute modify circuit comprises a state machine having at least a cacheable state and a non-cacheable state. In a particularly preferred embodiment, the state machine further includes a cacheable/cacheable state, a cacheable/non-cacheable state, a non-cacheable/cacheable state and a non-cacheable/non-cacheable state for designating a pair of simultaneously outstanding current/pending data operations as cacheable/cacheable, cacheable/non-cacheable, non-cacheable/cacheable and non-cacheable/non-cacheable, respectively.

In another advantageous embodiment, a second data monitoring unit communicates with the CPU to monitor signals issued and received by the CPU.

The present invention also provides a method of monitoring selected signals within an information processing system having a central processing unit (CPU) with an internal cache memory. The information processing system further includes an external memory module which exchanges data with the CPU. A cacheability attribute is associated with the data and designates the data as cacheable or non-cacheable. The method of the present invention comprises the steps of detecting a prespecified information sequence issued or received by the CPU during an exchange of data between the memory module and the CPU; asserting a trigger signal indicating that the prespecified information sequence has been detected; and modifying the cacheability attribute associated with the data in response to the assertion of the trigger signal.

According to another aspect of the present invention, an information processing system comprises a central processing unit (CPU) having an internal cache memory; an external memory module which exchanges data with the CPU, wherein a cacheability attribute is associated with the data and designates the data as cacheable or non-cacheable; and a cacheability attribute modify circuit which modifies the cacheability attribute associated with the data exchanged between the CPU and the memory module.

In a preferred embodiment of the invention an external cache memory is in communication with the CPU, the memory module and the cacheability attribute modify circuit.

In another preferred embodiment the information processing system further comprises a bus controller, and the cacheability attribute modify circuit is included within the bus controller. In a particularly preferred embodiment, the cacheability attribute modify circuit comprises a field programmable gate array (FPGA).

DETAILED DESCRIPTION OF THE INVENTION

Figure 1:
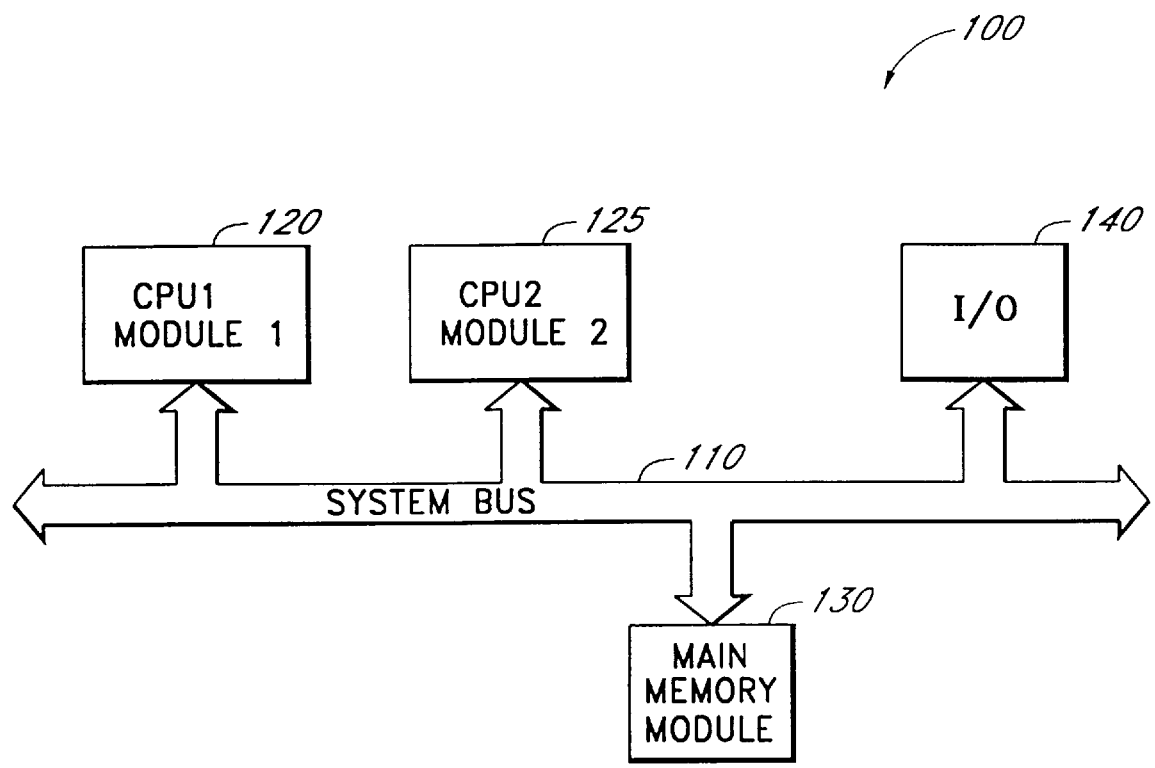
FIG. 1 is a schematic block diagram of a typical microprocessor system including one or more central processing unit (CPU) modules together with a memory module and an input/output (I/O) device.

FIG. 1 is a simplified schematic block diagram showing a multiprocessor information processing system 100, which may, for example, comprise a personal computer, a computer mainframe, or other information-processing systems which require multiple processing units. It should be understood that, for purposes of the description of the present invention, it is not necessary to implement the present invention within a multiprocessor system. The multiprocessor system 100 includes a system bus 110 which provides communication amongst a first CPU module 120, a second CPU module 125, a main memory module 130, and an input/output device 140. It should be noted that the schematic block diagram of FIG. 1 is highly simplified and does not depict many of the accessory circuit elements and buffers typically associated with multiprocessor systems, as will be appreciated by those of ordinary skill in the art. Each of the CPU modules 120, 125 may, for example, comprise 80486 Intel microprocessors, Intel Pentium microprocessors, or the like, in addition to a cache memory, conventional bus interface circuitry, and subsystem circuitry (not shown here), which will be described in greater detail with reference to FIG. 2.

The main memory module 130 may, for example, comprise 64-Mbit dynamic random access memory (DRAM) such as those manufactured by Motorola under the Model No. MCM51G400. As will be appreciated by those of ordinary skill in the art, the memory module also may comprise a bus interface as well as memory control circuitry (not shown) configured to support interleaving. The input/output device 140 may, for example, comprise a disk drive, a printer, a keyboard or display, or any other input/output devices commonly associated with multiprocessor systems. The system bus 110 may, in one embodiment, comprise a 32-bit or a 64-bit bus such as a PCI bus.

In operation, each of the CPUs 120, 125 serves as a master unit which controls data transfers on the bus and initiates memory and I/O requests on the system bus 110. When neither CPU 120, 125 has control of the system bus 110, and there are no pending requests within either of the CPUs 120, 125, the bus 110 is in a bus-free phase. If the CPU module 120 or the CPU module 125 initiate a data transfer via the bus 110, the system bus 110 enters an arbitration phase. Within the arbitration phase, each of the master units on the system bus 110 vies for control of the bus 110. Within a selection phase of the bus 110, control of the bus 110 is granted to that master unit which has the highest priority request. Finally, once one of the master units has control of the bus 110, data or command signals may be transferred via the bus 110 within a command or data phase.

Thus, for example, if the CPU module 120 wants to access information stored within the memory module 130, the CPU module 120 initiates a request to obtain control of the system bus 110. If there are no other requests to obtain control of the system bus 110, then the CPU module 120 immediately obtains control of the system bus 110. If, however, another master device such as the CPU module 125 also has a pending data request, then the priority of the data request from the CPU module 120 is compared to the priority of the request issued by the CPU module 125. The higher priority request is granted so that the CPU module issuing the higher priority request gains control of the system bus 110. Assuming, for the sake of example, that the CPU module 120 gains control of the bus 110, and wants to access data stored within the memory module 130, then address data is transmitted by the CPU module 120 to the memory module 130 via the bus 110. The memory module 130 receives the address request and identifies it as an address contained within the memory module 130. The memory module 130 then retrieves the data at the desired address and retransmits this data to the CPU 120 via the bus 110.

Figure 2:
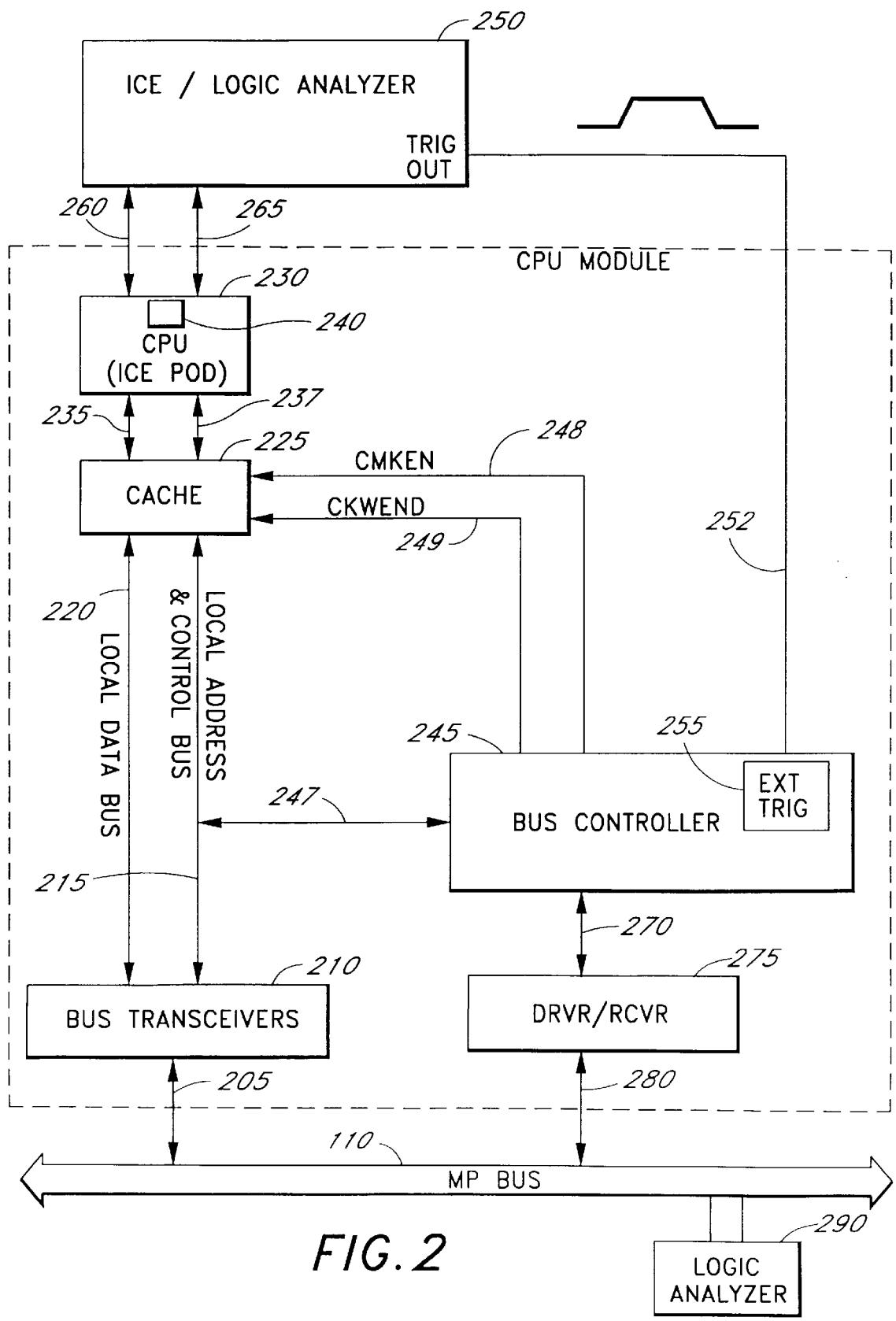
FIG. 2 is a schematic block diagram which details the main structural internal components of the CPU module of FIG. 1, and including an ICE in accordance with the teachings of the present invention.

FIG. 2 illustrates a schematic block diagram of the internal circuitry of the first CPU module 120 of FIG. 1 constructed in accordance with the teachings of the present invention, together with a pair of ICEs which are used to debug software which is run within the CPU module 120. The system bus 110 communicates with bus interface transceivers 210 via a bidirectional communication bus 205. The bus transceivers 210 communicate with a cache controller and external cache memory 225 via a bidirectional local address and control bus 215 as well as a bidirectional local data bus 220. The cache controller and external cache memory 225 communicates with a CPU 230 via a bidirectional communication link 237 which carries address and control data and a bidirectional communication link 235 which carries data. In one embodiment, the CPU 230 may comprise a Pentium microprocessor chip available from INTEL. The bidirectional communication links 235, 237 connect to an internal cache memory 240 within the CPU 230. An ICE/logic analyzer 250 commercially available from Hewlett Packard connects to the communication links 235, 237 between the cache controller and external cache memory 225 and the CPU 230 by means of monitoring buses 260, 265, respectively.

The local address and control bus 215 communicates with a bus controller 245 via a bus 247. The bus controller 245 provides outputs to the cache controller and external cache memory 225 via a cache enable line 248 and a cache window line 249. It will be appreciated by those of ordinary skill in the art, that the lines 248, 249, although depicted in FIG. 2 as separate lines connecting the bus controller 245 with the external cache memory 225 for purposes of clearly depicting the present invention, are typically understood to be included within the bus 247 and the bus 215. The bus controller 245 further receives input from the ICE 250 via a "trigger out" line 252. The "trigger out" line 252 provides a trigger signal to external trigger circuitry 255 within the bus controller 245. The external trigger circuitry 255 may, for example, comprise a field programmable gate array (FPGA) such as those manufactured by Altera. The operation of the external trigger state machine 255, as well as the PAL equations associated with the external trigger state machine 255, will be described in greater detail below with reference to FIG. 3 and APPENDIX A.

The bus controller 245 communicates with a driver receiver circuit 275 via a bidirectional communication bus 270. The driver receiver circuitry 275 communicates with the system bus 110 via a bidirectional communication bus 280. A logic analyzer 290 connects along the path of the system bus 110 so that the logic analyzer 290 is able to monitor data and instruction transactions along the system bus 110.

The operation of the internal circuitry of the CPU module 120 shown in FIG. 2 is described generally below. As the CPU module 120 communicates with the other elements on the system bus 110 (e.g., the memory modules 130, 135, the I/O unit 140, etc.), address, control and data signals are transferred onto and received from the multiprocessor bus 110 via the bus transceiver 210 and the bidirectional communication bus 205. These address, control and data signals are passed to the cache controller and external cache memory 225 via the local data bus and the data local address and control bus 220, 215, respectively.

When the CPU 230 processes or modifies data written at memory locations within the external cache 225, data, address and control signals are transferred to the internal cache 240 within the CPU 230 via the buses 235, 237. The ICE 250 is programmed to recognize specified cacheable addresses and data to be written at these addresses using conventional address and data comparison circuits. When a cacheable address block, or cache line, is communicated to the CPU 230 from the cache controller and external cache memory 225, and the ICE 250 recognizes this address block as an address block possibly containing a prespecified data or instruction sequence, the ICE 250 transmits a trigger pulse to the external trigger state machine 255 within the bus controller 245 via the line 252. Upon reception of a trigger pulse from the ICE 250, the external triggering state machine 255 determines if the cache line detected by the ICE 250 should be designated as a non-cacheable memory address. By designating only a single cache line at a time as non-cacheable, rather than disabling the entire cache memory, the system performance, and most notably the processing speed, is typically not hampered significantly. Typically, the bus controller 245 transmits a signal to the cache controller and external cache memory 225 which indicates that the currently pending bus transaction is non-cacheable.

Once the designated cache line is specified as non-cacheable, this causes the CPU 230 to output all data processing and modifications at addresses within the designated cache line onto the system bus 110 (FIG. 1). Thus, the logic analyzer 290, connected along the multiprocessor bus 110, is able to observe all data and instruction sequences within the designated cache line. The logic analyzer 290 is then capable of specifically recording data and instruction streams of interest as desired by a troubleshooter in debugging the software application implemented within the multiprocessor system 100.

As described herein, the logic analyzer 290 is necessary to record the trigger event which is to be debugged. Since the ICE 250 is programmed only to identify an address or range of addresses that are to be designated as non-cacheable, the ICE 250 is typically not able to also monitor the data flow sequence of the data which has been designated as non-cacheable for debugging purposes. Thus, the logic analyzer 290 is used to monitor the data and instruction stream once the ICE 250 has signaled that an address range is to be designated as non-cacheable. Of course, it should be understood that a specially designed logic analyzer which is capable of monitoring multiple trigger events could be used instead of two seperate devices.

A more detailed description of the operation of the internal circuitry within the CPU module 120 and, in particular, the operation of the bus controller 245 and external triggering state machine 255, in combination with the ICE 250 and the logic analyzer 290, is described in greater detail below with reference to the state diagram of FIG. 3 and the timing diagrams of FIG. 4. As is well known in the art, certain memory locations within the main memory module 130 are designated as cacheable memory locations. That is, these memory locations have corresponding memory locations within the cache memories 225, 240 within the CPU module 120 as well as cache memories (not shown) within the CPU module 125. Whenever cacheable memory locations are accessed by the CPU module 120, address, control and data information are transferred via the multiprocessor bus 110 to the cache controller and external cache memory 225 via the bus 205, the bus transceivers 210, and the local address control and data buses 215, 220. Typically, data is written to the external cache 225 in blocks called cache lines. A cache line may comprise several sequential memory address locations within the cache 225 and all the memory locations within a given cache line are designated as cacheable by a cacheability flag. According to the teachings of the present invention, when the ICE 250 detects a cache line which contains a memory location of interest (i.e., a memory location which the troubleshooter is interested in monitoring to determine the operation of the software applications program), then the ICE 250 transmits the trigger signal to the bus controller 245 via the line 252. Based upon the state of the external trigger state machine 255, the bus controller 245 may output a cacheability override signal to the cache controller and external cache memory 225 immediately, or on a delayed basis in the event of a pipelined signal which is to have a cacheability attribute overridden, as will be discussed in greater detail below.

Figure 3:
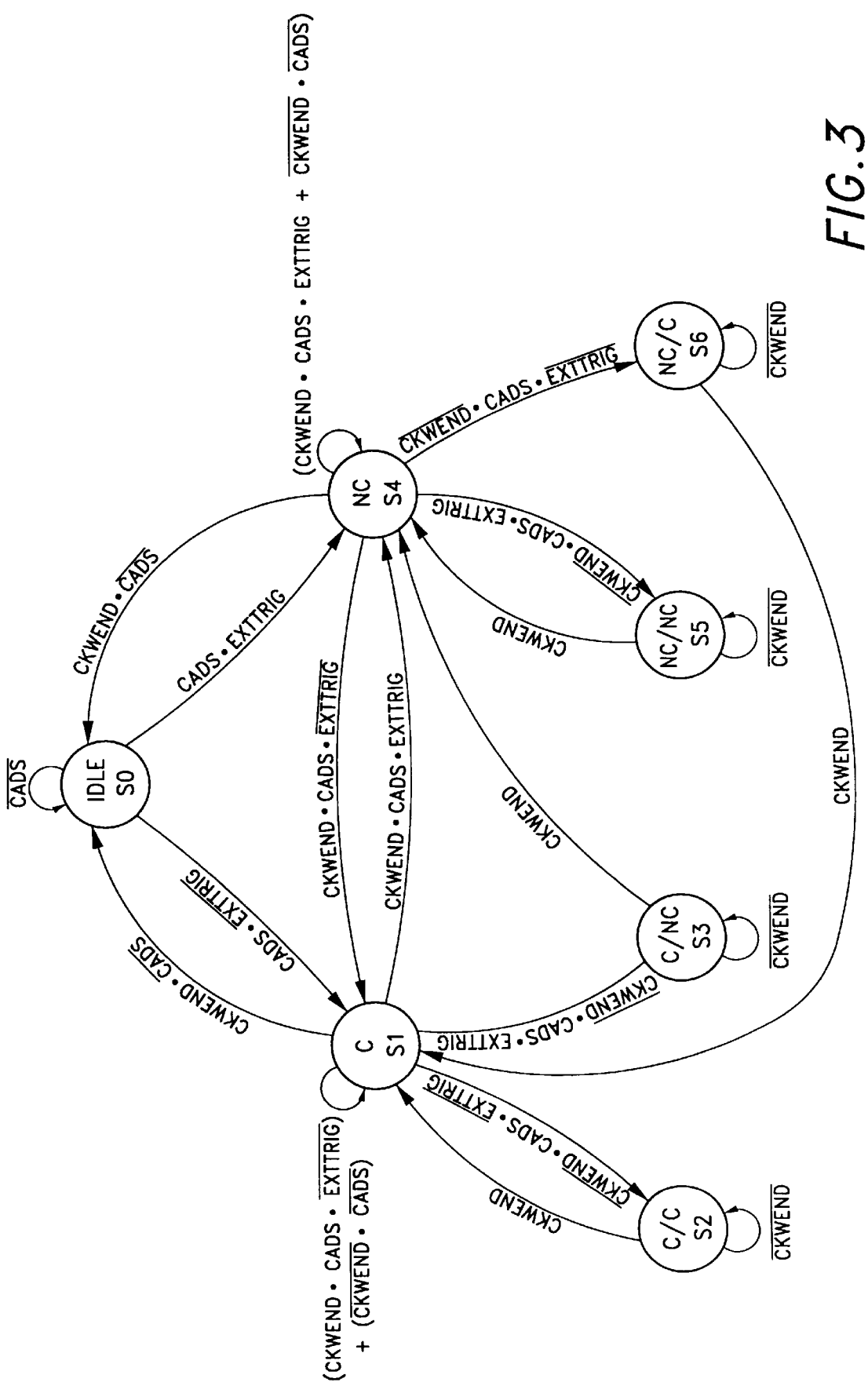
FIG. 3 is a state diagram which details the operation of the external trigger state machine contained within the bus controller of the block diagram of FIG. 2 for multiple pipeline requests.

The various states of the external trigger state machine 255 within the bus controller 245 are depicted in the state diagram of FIG. 3. In addition, the PAL equations corresponding to the state diagram of FIG. 3 are provided in Appendix A below. As depicted in FIG. 3, the external trigger state machine 255 remains in an idle state S0 so long as a cache address strobe signal, CADS# 409 (see FIG. 4) remains inactive. In the state diagram of FIG. 3, all signals are presumed to be active high. A bar over a signal in FIG. 3 indicates that the signal is inactive. In contrast, in FIG. 4 a # sign or a "-" sign after a signal indicates the logic level at which a signal is active (e.g., CADS# in FIG. 4 is an active low signal). Since the CADS# signal 409 in FIG. 4 is active low, the CADS# signal 409 remains inactive while CADS in FIG. 3 is high. Thus, as illustrated in FIG. 3, the bus controller remains in the idle state SO until CADS becomes active. However, when the CADS signal is active (i.e., CADS# in FIG. 4 is active low), then the external trigger state machine 255 moves from the state S0 to a state S1 or a state S4.

The external trigger state machine 255 moves to the state S1 when the CADS signal is active and an EXTTRIG signal (EXTTRIG 415 in FIG. 4) is inactive. That is, a cacheable address strobe has been activated while no external trigger signal has been transmitted to the external trigger state machine 255 from the ICE 250 via the line 252. Since the cacheable address strobe has been activated and there is no external trigger signal from the ICE 250, this indicates that the cacheable address which is to follow should retain a cacheability flag. As briefly stated above, the cacheability flag associated with a cache line indicates that the cache line is to be stored into cache memory and not immediately written through to the main memory. Thus, the "C" in state S1 indicates that a cacheable address is being delivered to the cache controller and external cache memory 225 and from there to the CPU 230. The "C" also indicates that the external trigger state machine 255 will drive the cacheability attribute active to enable the data to be cached (i.e., the cacheability attribute will be passed to the cache controller and external cache memory 225 by the external trigger state machine 255.

If, however, the CADS signal is active and the EXTTRIG signal is also active, an external trigger signal has been sent from the ICE 250 to the bus controller 245 via the line 252. Thus, the cacheability flag associated with the cache line which is to follow should be overridden in order to cause the bus operation following the trigger to be a non-cacheable operation. Thus, the external trigger state machine 255 moves to the state S4, which indicates that the pending bus operation is a non-cacheable operation, as represented by an "NC" in the state S4. The "NC" also indicates that the external trigger state machine 255 will drive the cacheability attribute low to prevent the data from being cached.

Assuming that the external trigger state machine 255 is in the state S1, the external trigger state machine 255 remains in the state S1 while an active low cache window end signal CKWEND and the CADS signal are inactive. That is, if the cacheable window has not yet ended, as indicated by an inactive CKWEND, and a cacheable address strobe signal is not being asserted, then the external trigger state machine 255 stays within the state S1, indicating that the current bus operation is a cacheable operation. This is because an inactive cache window end signal CKWEND (CKWEND# in FIG. 4) indicates that the cacheability attribute of a pending bus operation has not yet been received and the cacheability override cycle is therefore not complete. Likewise, the external trigger state machine 255 remains in the state S1 if a cacheable operation is initiated just as the previous cacheable operation has ended. Thus, if the CKWEND signal and the CADS signal are active and the EXTTRIG signal is inactive (i.e., if the cacheable window has ended and the cache address strobe is being asserted while the external trigger signal is not being asserted via the line 252), then the external trigger state machine 255 remains in the state S1, thereby indicating that the previous bus operation has been completed and the pending bus operation is a cacheable operation. Once the cacheable window has ended and the cache address strobe is no longer asserted, the external trigger state machine 255 transitions from the state S1 to the idle state SO. That is, when CKWEND is active and CADS becomes inactive, the external trigger state machine 255 transitions from the state S1 back to the state S0, thereby indicating that the CPU 230 is idle (i.e., has no pending bus operations).

The external trigger state machine 255 may also transition from the state S1 to the state S4 (that is, from a state indicating that a cacheable bus operation is pending to a state indicating that a non-cacheable bus operation is pending) upon the application of an active CKWEND signal, an active CADS signal, and an active EXTTRIG signal. That is, when the cache window has ended (i.e., the cacheability attribute for the previously pending bus operation has been received) and another cacheable address strobe has been initiated and, furthermore, an external trigger signal is sent from the ICE 250 to the external trigger state machine 255 via the line 252. This indicates that another cacheable address is to be accessed within the cache controller and external cache memory 225 and that this address should be designated as a non-cacheable address since it is an address which is to be monitored by the ICE 250. Thus, the external trigger state machine 255 transitions from the state S1, indicating that a cacheable bus operation is pending, to the state S4, indicating that the newly pending bus operation is to be designated as a non-cacheable operation. Thus, while in the state S4, the external trigger state machine 255 causes the bus controller 245 to override the cacheability flag for the newly pending bus operation.

The external trigger state machine 255 may transition from the state S4 back to the idle state SO when the CKWEND signal is active and the CADS signal becomes inactive. That is, the external trigger state machine 255 transitions from a state indicating that a non-cacheable bus operation is being performed to an idle state, indicating that no bus operations are performed, when the cache window has ended and there is no address strobe indicating that further bus operations are to follow immediately.

The external trigger state machine 255 remains in the state S4 when the CKWEND signal and the CADS signal are active and the EXTTRIG signal is active. That is, the external trigger state machine 255 remains in the state indicating that a non-cacheable bus operation is occurring when the cacheable window end signal is being asserted and the cacheable address strobe is asserted together with the external trigger signal on the line 252. The assertion of the CKWEND, CADS, and EXTTRIG signals indicates that as one non-cacheable operation is completed, another operation is initiated which is to be designated as non-cacheable. Consequently, the external trigger state machine 255 remains in the state S4. The external trigger state machine 255 also remains in the state S4 while the cacheable window has not ended (i.e., the CKWEND signal is inactive) and there is no cacheable address strobe so that the CADS signal is inactive as well.

In the event that another bus operation occurs just as the prior bus operation is completing, as indicated by the assertion of a second active CADS signal, and the second bus operation occurs while the CKWEND signal is being asserted and, furthermore, the external trigger signal from the ICE 250 is inactive, then the next bus operation is a cacheable bus operation. Therefore, the external trigger state machine 255 transitions from the state S4 immediately to the state S1, thereby indicating that the next bus operation is a cacheable operation.

The foregoing description would be a sufficient account of the operation and state transitions of the external trigger state machine 255 if the present invention were not to be implemented within a pipelining data device. However, because in pipelining processor systems more than one outstanding request may be issued at a time, the external trigger state machine 255 includes the states S2, S3, S5, and S6. The states S2, S3, S5, and S6 indicate that there are two pending bus operations. When the external trigger state machine 255 is in the state S2, both pending bus operations are cacheable bus operations. If the external trigger state machine 255 is within the state S3, the first pending bus operation is a cacheable bus operation while the second pending bus operation is a non-cacheable bus operation. If the external trigger state machine 255 is within the state S5, both pending bus operations are non-cacheable bus operations. If the external trigger state machine 255 is within the state S6, the first pending bus operation is a non-cacheable operation and the second pending bus operation is a cacheable bus operation.

From a state S1, while a cacheable bus operation is pending, the external trigger state machine 255 transitions to the state S2 if a second cacheable bus operation is indicated. To indicate that a second cacheable bus operation is to occur, the cacheable address strobe signal (CADS) is active, while the cache window is not being asserted (i.e., CKWEND is inactive). Furthermore, to transition from the state S1 to the state S2, it is necessary that the EXTTRIG signal be inactive, thereby indicating that no trigger signal is being asserted over the line 252. Thus, the external trigger state machine 255 transitions from the state S1 to the state S2 when a second cacheable address is indicated during the cache window and no trigger signal is asserted over the line 252. The external trigger state machine 255 remains in the state S2 while the cacheable window signal is not asserted (i.e., while inactive).

Once the cacheable window has ended (i.e., the CKWEND signal becomes active), control passes from the state S2 back to the state S1. This indicates that the first pending cacheable bus operation has ended, while the second cacheable bus operation is still pending. Therefore, the external trigger state machine 255 indicates that a single cacheable bus operation is in progress within the state S1.

If, while in the state S1, a second bus operation becomes pending, and the second bus operation is designated as a non-cacheable bus operation, then the external trigger state machine 255 transitions from the state S1 to the state S3. This state transition occurs when the cacheable address strobe signal CADS is asserted while the cache window end signal remains unasserted, so that the CKWEND signal is inactive. Furthermore, in order to transition from the state S1 to the state S3, the EXTTRIG signal is also asserted to indicate that the bus operation is to be designated as non-cacheable. The external trigger state machine 255 remains within the state S3 while the cacheable window end signal is unasserted, as indicated by the inactivity of the CKWEND signal. When the cache window has ended, as indicated when the CKWEND signal becomes active, then the external trigger state machine 255 transitions from the state S3 to the state S4. That is, when the first pending cacheable bus operation has been completed and the cache window has ended, then the external trigger state machine 255 returns to the state S4, indicating that only a single non-cacheable bus operation is pending.

If the external trigger state machine 255 is within the state S4, indicating that a non-cacheable bus operation is pending, and a second pending operation occurs, then the external trigger state machine 255 may transition from the state S4 to either of the states S5, S6, depending upon whether or not the second pending bus operation is cacheable or non-cacheable. If the second pending bus operation is non-cacheable, then the external trigger state machine 255 transitions from the state S4 to the state S5, indicating that there are presently pending two bus operations, which are both designated as non-cacheable. Thus, to transition from the state S4 to the state 5, the cacheable address strobe signal CADS must be asserted while the cache window end signal is unasserted so that the CKWEND signal is inactive. Furthermore, the external trigger signal EXTTRIG must be active to indicate that the second pending bus operation is to be designated as a non-cacheable operation. The external trigger state machine 255 remains within the state S5 as long as the cacheable window has not ended (i.e., CKWEND is inactive). Once the cache window has ended, as indicated by the signal CKWEND becoming active, the external trigger state machine 255 transitions from the state S5 back to the state S4. That is, the first bus operation which was designated as non-cacheable has now been completed, and only the second pending bus operation designated as non-cacheable remains so that the external trigger state machine 255 returns to the state S4, indicating that only one non-cacheable bus operation is pending.

If, while in the state S4 indicating that a single non-cacheable bus operation is pending, a second bus operation which is to be designated as cacheable occurs, then the external trigger state machine 255 transitions from the state S4 to the state S6. To transition from the state S4 to the state S6, the external trigger state machine 255 must first receive an asserted cacheable address strobe CADS signal, together with an inactive CKWEND signal. Furthermore, no external trigger signal should be asserted via the line 252, so that the EXTTRIG signal must be inactive. Once the external trigger state machine 255 has transitioned from the state S4 to the state S6, the external trigger state machine 255 remains within the state S6 while the cache window has not ended (i.e., while CKWEND is inactive). Once the cache window has ended, as indicated by the CKWEND signal becoming active, then the external trigger state machine 255 transitions from the state S6 to the state S1. That is, the external trigger state machine 255 transitions from a state which indicates that two bus operations are pending, of which the first is non-cacheable and the second is cacheable, to a state where only one bus operation is pending and this pending operation is to be designated as cacheable. In this manner, the external trigger state machine 255 is able to indicate which bus operations are to be designated as cacheable and non-cacheable within a pipelining information processing system.

Figure 4:
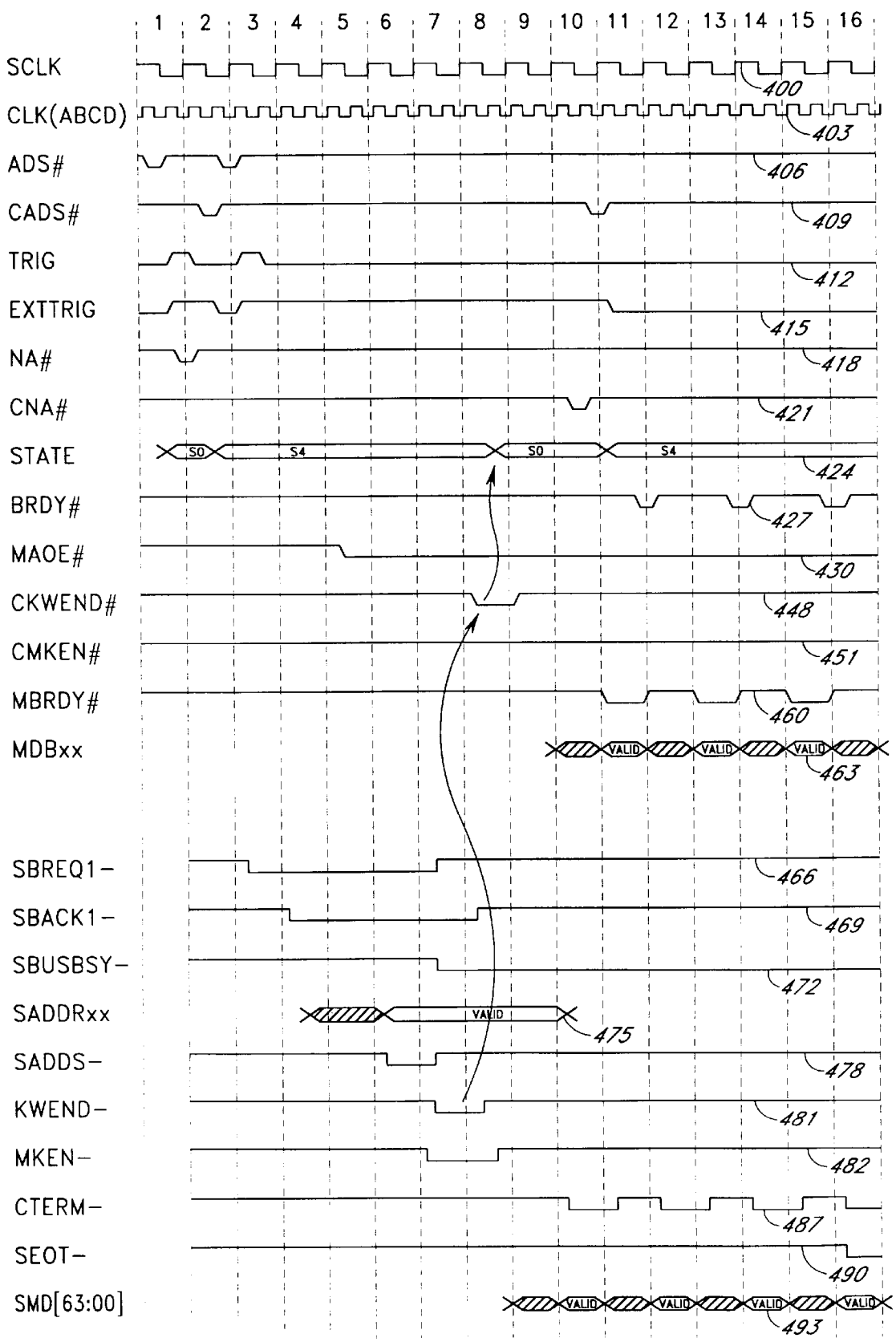
FIG. 4 is a timing diagram which illustrates the cacheability override feature of the present invention during a read cycle initiated by the CPU module of FIG. 1.

FIG. 4 is a timing diagram which illustrates a read operation followed by an override non-cacheable operation, followed by a cache refill operation. It should be understood that not all signals transmitted among the several elements of the CPU module 120, as well as the elements of the multiprocessor system 100, are depicted in FIG. 4. For the sake of simplicity and clarity in expressing the essence of the present invention, FIG. 4 depicts only those signals which relate specifically or generally to the operation of the external means for controlling the cacheability attribute of CPU accesses of the present invention.

As shown in FIG. 4, a system clock signal SYSCLK 400 provides universal timing for the entire multiprocessor system 100. A subsystem clock signal CLK 403 provides timing for the CPU 230. An address strobe signal ADS# 406 is asserted over the line 237 to indicate that a valid address is present at the output of the CPU 230. A cache controller address strobe signal CADS# 409 is asserted over the line 215 to indicate that an address is valid on the local address bus 215. A trigger signal TRIG 412 is asserted over the line 252 to indicate that the currently pending cacheable address is to be overridden and is designated as a non-cacheable address by the bus controller 245. An external trigger signal EXTTRIG 415 corresponds to a latched trigger signal 412 and is asserted within the bus controller 245. The EXTTRIG signal 415 also indicates that the currently pending cacheable address is to be overridden and designated as a non-cacheable address by the bus controller 245. A next address signal, NA#, 418 is asserted over the bus 237 by the cache controller 225 and indicates that the cache controller is requesting the next address. A cache controller next address signal, CNA#, 421 is asserted by the bus controller 245 over the buses 247, 215 and indicates that the bus controller 245 is ready to begin processing the next cycle.

A state signal 424 indicates the state of the external trigger state machine 255. A bus ready signal BRDY# 427 is asserted by the bus controller 245 over the buses 247, 215 to indicate to the CPU 230 and the cache controller 225 that valid data is on the data bus 220. An address output enable signal MAOE# 430 is asserted by the bus controller 245 over the busses 247, 215 to indicate that the cache controller 225 should drive an address out onto the bus 215.

A local cache window end signal CKWEND# 448 is asserted over the line 249 to indicate that the cacheability attribute of a bus operation is valid on the line 248. The cacheability attribute signal indicates whether or not a pending bus operation is to be designated as cacheable or not cacheable is present on the line 248. A cache enable signal, CMKEN#, indicates whether or not a pending bus operation is to be designated as cacheable or not cacheable, and enables or disables the cacheability flag associated with a given cache line. A signal MBRDY# 460 indicates that valid data is present on the local data bus 220 and is asserted by the bus controller 245 via the system busses 247, 215. A plurality of data signals MDBxx 463 are the valid data which are asserted on the local data bus 220.

The signals discussed above are all signals local to the CPU module 120. With the exception of the TRIG signal 412 and the EXTTRIG signal 415, all of the above discussed signals are active low (as indicated by the # suffix) so that they are asserted when the voltage level for these signals corresponds to zero volts. The signals described below are system wide signals and are active low unless otherwise indicated.

A system bus request signal, SBREQ1-, 466 is asserted over the bus 110 (via the bus 270, the driver/receiver circuitry 275, and the bus 280) by the bus control circuitry 245 within the CPU module 120 to indicate that the CPU module 120 is requesting control of the multiprocessor bus 110. A system bus acknowledge signal SBACK1- 469 is asserted over the bus 110 by the central arbiter on the system bus 110 to indicate that control of the system bus has been granted to the first CPU module 120. A system bus busy signal SBUBSY-472 is asserted over the system bus 110 to indicate that the system bus 110 is currently under the control of one of the mastering modules within the multiprocessor system 100. SADDRxx signals 475 are valid address data which are present on the multiprocessor bus 110. A strobe address signal SADDS- 478 is asserted via the bus 110 to indicate that a valid address is present on the multiprocessor bus 110. A KWEND- (cache window end) signal 481 is asserted over the bus 110 by, for example, the memory module 130, to indicate to the bus controller 245 that the cacheability attribute of a bus operation is valid on the bus 110. A cache enable signal, MKEN-, 482 is asserted over the system bus 110 to enable or disable the cacheability flag associated with a given cache line. A cycle terminate signal, CTERM-, 487 is asserted via the bus 110 to indicate that data is valid on the bus 110. A system end of transaction signal, SEOT, 490 is asserted over the bus 110 and indicates that a data transaction cycle is over (e.g., a data transfer has been completed). SMD [63:00] signals 493, asserted over the system bus 110, are the valid data present on the system bus 110 which are being transmitted from the memory module 130 to the CPU module 120 in control of the bus 110, or vice versa.

The CPU 230 initiates a read operation by driving an address (not shown) onto the address and control bus 237 between the CPU module 230 and the external cache memory 225. As depicted within the first clock cycle of FIG. 4, the address strobe signal 406 is asserted to indicate that the valid address is present on the address bus 237. The address driven onto the bus 237 by the CPU 230 may or may not be of interest for debugging purposes. If the address on the bus 237 is not of interest, then the ICE 250 will not issue a trigger signal, TRIG, 412. However, if the address on the bus 237 designates a cache line having an address which the ICE 250 is programmed to monitor, then the ICE 250 asserts the TRIG signal 412. As depicted in FIG. 4, once the ICE 250 determines that the address present on the address bus 237 is an address of interest, the ICE 250 asserts the trigger signal 412 across the line 252 in the first clock cycle of FIG. 4. Within the same clock cycle, the external trigger signal, EXTTRIG, 415 is also asserted and latched until the cache controller address strobe signal, CADS# 409, is asserted within the second clock cycle over the address and control bus 215, indicating that the address is valid on the local address bus 215. The simultaneous assertion of the CADS# signal 409, as well as the EXTTRIG signal 415, indicates that the external trigger state machine 255 should transition from the state S0 to the state S4 (see FIG. 3). The transition from the state S0 to the state S4 is depicted in the second clock cycle by the STATE signal 424. Also asserted within the second clock cycle is the next address signal, NA# 418, which indicates that the external cache memory 225 is capable of receiving another address from the CPU module 230.

Once the address which is to be read by the CPU module 120 has been driven out to the local address bus 215, the bus controller 245 is able to request control of the system bus 110, so that the address can be output to the memory module 130 via the system bus 110. Consequently, within the second clock cycle, the bus controller 245 asserts the system bus request signal, SBREQ1-, 466 via the bus 270, the driver/receiver circuit 275, and the bus 280. A central arbiter (not shown) on the system bus 110 acknowledges the SBREQ1- signal 466 and grants control of the system bus 110 to the CPU module 120 by asserting the system bus acknowledge signal, SBACK1- 469, in the third clock cycle. Thus, within the fifth clock cycle, the cache controller and external cache memory 225 drives the address onto the local address bus 215, as indicated by the assertion of the MAOE# signal 430. Subsequently, within the sixth clock cycle, the address from which data is to be read is driven onto the system bus 110 by the bus transceivers 210. To indicate that the valid address is present on the system bus 110, the system bus address strobe signal, SADDS- 475, is also asserted in the sixth clock cycle. Also within the sixth clock cycle, the system bus busy signal, SBUSBSY- 472, is asserted to indicate that the CPU module 120 has control of the system bus 110.

The cache window end signal, KWEND- 481, is asserted in the seventh clock cycle to indicate that the cacheability attribute associated with the accessed data address is valid on the system bus 110. The cacheability attribute enable signal, MKEN- 482, is also asserted within the seventh clock cycle to indicate that the memory address currently present on the system bus 110 is a cacheable memory address location. As is well known in the art, the assertion of the MKEN-signal 482 indicates to the bus controller 245 that the data which is subsequently read into the designated memory address should be stored within the external cache memory 225. Normally, the bus controller 245 would pass the cacheability enable signal 482 to the cache controller and external memory 225 by asserting the cache controller cacheability enable signal, CMKEN# 451, on the line 248. However, as indicated within the eighth clock cycle, when the CKWEND# signal 448 is asserted to indicate that the cacheability attribute signal is valid on the line 248, the CMKEN# signal 451 does not indicate that the pending bus operation is a cacheable operation. This is because the external trigger state machine 255 is in state S4 when the MKEN- signal 482 is received by the bus controller 245. Thus, in accordance with the teachings of the present invention, the external trigger state machine 255 overrides the cacheability signal 482 within the bus controller 245. Consequently, the cacheability enable signal CMKEN# 451, which would normally be asserted within the eighth clock cycle, is not asserted, as depicted within the timing diagram of FIG. 4. That is, the cacheability enable signal, CMKEN# 451, corresponds to a logical one, thereby indicating that the data read by the CPU 230 should not be stored into the external cache memory 225, but rather should be written out to the memory module 130. Once the CKWEND# signal 448 has been asserted within the eighth clock cycle, this indicates that the external trigger state machine 255 should change states from non-cacheable state S4 to the idle state S0.

In this manner the address, control, and data signals associated with the pending read operation are assured of being written through to the memory module 130 via the bus 110. Thus, none of these signals are modified within the internal cache memory 240 (FIG. 2) without also being written out over the system bus 110. This guarantees that the logic analyzer 290 on the system bus 110 will be able to observe all modifications associated with addresses in the overridden cache line, so that debugging such systems is facilitated.

After the cacheability enable signal 482 has been overridden by the bus controller 245, valid data is placed onto the system bus 110 by the memory module 130 and this data is clocked into the CPU module 120 as indicated by the assertion of the SMD [63:00] and CTERM- signals 493, 487 within the clock cycles 10–16. Once the valid data is present on the local data bus 220, this data is then clocked into the external cache memory 225 as indicated by the assertion of the MBRDY# and MDBxx signals 460, 463 over the clock cycles 11–17. The SEOT- signal 490 signals the end of the read cycle over the system bus 110 within the sixteenth clock cycle.

While the first read operation is pending, a second read operation is initiated as indicated by the assertion of the ADS# signal 406 in the second clock cycle. The ICE 250 identifies the address (not shown) as an address of interest which should have the cacheability attribute overridden, and therefore issues the TRIG signal 412 over the line 252 in the third clock cycle. The TRIG signal 412 causes the EXT-TRIG signal 415 to be asserted until the eleventh clock cycle when the CADS# signal 409 is asserted. The CADS# signal 409 is asserted in response to the assertion of the CNA# signal 421 in the tenth clock cycle. The external trigger state machine 255 remains in the idle state, S0, until the next cache controller address strobe signal, CADS# 409, is asserted within the tenth clock cycle together with the external trigger signal EXTTRIG 415 so that the external trigger state machine 255 transitions from the state S0 back to the state S4, indicating that a cacheability attribute for the next bus operation is to be overridden so as to designate the pending read operation as non-cacheable.

Although not shown in FIG. 4, the above-described cacheability override process is repeated. In this manner, cacheability attribute of individual cache lines may be overridden so that the entire external cache memory 225 need not be disabled to observe operations of interest during debugging. Thus, the information processing system 100 is capable of operating at or near normal operating speeds so that failures which are observed in the normal operation of the information processing system 100 are also observable in accordance with the apparatus and method of the present invention.

Although the preferred embodiment of the present invention has been described and illustrated above, those skilled in the art will appreciate that various changes and modifications to the present invention do not depart from the spirit of the invention. For example, as will be appreciated by one of skill in the art, the two ICE's 250, 290 could be combined into a single circuit which both issues a trigger signal and also monitors and records data, control and address signals of interest. Accordingly, the scope of the present invention is limited only by the scope of the following appended claims.

APPENDIX A

```
-- patn8.tdf
------------------------------------------------------
-- Revision History
-- 9/MAY/94 Original by Brian Bennett
-- This allows an external trigger to override the cacheability
-- flag and cause ONE bus operation following the trigger to be non-cacheable
-- By using a logic analyzer to continuously trigger a specific address,
-- it can be held NEVER cached in the CPU nodule. This may be useful
-- for debugging software problems. Disabling the entire cache often
-- changes the system timing too much, or slows the system down too much.
```

APPENDIX A-continued

```
------------------------------------------------------
--Constant declarations
Constant 3b_S4 = B"100";
Constant 3b_S5 = B"101";
Constant 3b_S6 = B"110";
Subdesign patn8
   (
      clk             : Input;
      reset           : Input;
      cads            : Input;
      kwend           : Input;
      ext_trig        : Input;
      trig_nocache    : Output;
      nreset_trig     : Output;
      ext_state[2..0] : Output;
   )
VARIABLE
      next_trig_nocache : NODE;
      next_nreset_trig  : NODE;
-- ****************************************************
      ext_state: MACHINE OF BITS(ext_[2..0])
         WITH STATES(
         S0   = B"000",
         S1   = B"001",
         S2   = B"010",
         S3   = B"011",
         S4   = B"100",
         S5   = B"101",
         S6   = B"110",
         S7   = B"111");
-- ****************************************************
      begin
         ext_state.clk = clk;
         ext_state.reset = reset;
      trig_nocache  = DFF(next_trig_nocache, clk, VCC, VCC);
      nreset_trig   = DFF(next_nreset_trig, clk, VCC, VCC);
      case ext_state is
-- *****************************
      when S0 =>
      IF ((cads) and (ext_trig)) then          -- next cycle non-cacheable (NC)
      ext_state = S4;
      ELSIF ((cads) and (!ext_trig)) then      -- next cycle cacheable
      ext_state = S1;
      ELSE
      ext_state = S0;
      end if;
-- *****************************
      when S1 =>                               -- one pending cacheable cycle
      IF (reset) then                          -- back to idle
      ext_state = S0;
      ELSIF ((kwend) and (!cads)) then         -- end of cycle back to idle
      ext_state = S0;
      ELSIF ((kwend) and (cads) and (ext_trig)) then  -- end of this cycle; NC
cycle pending
      ext_state = S4;
      ELSIF ((!kwend) and (cads) and (!ext_trig)) then -- now have two C cycles
pending
      ext_state = S2;
      ELSIF ((!kwend) and (cads) and (ext_trig)) then  -- now have C and NC cycles
pending
      ext_state = S3;
      ELSE
      ext_state = S1;                          -- loop here till one of the above events occur
      end if;
-- *****************************
      when S2 =>                               -- two pending cacheable cycles
      IF (reset) then                          -- back to idle
      ext_state = S0;
      ELSIF (kwend) then                       -- one cycle done; now only one pending
      ext_state = S1;
      ELSE
      ext_state = S2;                          -- wait here till cycle terminates; max ot two
outstanding requests
      end if;
-- *****************************
      when S3 =>                               -- two pending cacheable cycles first was C;
                                               2nd was NC
      IF (reset) then                          -- back to idle
      ext_state = S0;
```

APPENDIX A-continued

```
        ELSIF (kwend) then                              -- first cycle done 'C';
                                                        now only NC cycle pending
            ext_state = S4;
        ELSE
            ext_state = S3;                             -- wait here till cycle terminates; max of two
outstanding requests
        end if;
-- *****************************
        when S4 =>                                      -- one pending non-cacheable cycle (NC)
        IF (reset) then
            ext_state = S0;                             -- back to idle
        ELSIF ((kwend) and (!cads)) then                -- end of cycle back to idle
            ext_state = S0;
        ELSIF ((kwend) and (cads) and (!ext_trig)) then -- end of this cycle; C
cycle pending
            ext_state = S1;
        ELSIF ((!kwend) and (cads) and (!ext_trig)) then -- now have two cycles
pending; first is NC second is C
            ext_state = S6;
        ELSIF ((!kwend) and (cads) and (ext_trig)) then -- now have two cycles
pending, both are NC
            ext_state = S5;
        ELSE
            ext_state = S4;                             -- loop here till one of the above events occur
        end if;
-- *****************************
        when S5 =>                                      -- two pending non-cacheable cycles
        IF (reset) then                                 -- back to idle
            ext_state = S0;
        ELSIF (kwend) then                              -- one cycle done; now only one pending
            ext_State = S4;
        ELSE
            ext_state = S5;                             -- wait here till cycle terminates; max of two
outstanding requests
        end if;
-- *****************************
        when S6 =>                                      -- two pending cacheable cycles first was NC;
                                                        2nd was C
        IF (reset) then                                 -- back to idle
            ext_state = S0;
        ELSIF (kwend) then                              first cycle done 'NC';
                                                        now only C cycle pending
            ext_state = S1;
        ELSE
            ext_state = S6;                             -- wait here till cycle terminates; max of two
outstanding requests
        end if;
-- *****************************
        when S7 =>
            ext_state = S0;                             -- Should not be here; back to idle.
-- *****************************
        when others => ext_state = S0;                  -- all other states
        End case;
-- **********************************************************
-- **********************************************************
-- **********************************************************
-- RESET_TRIG
        IF (cads) then                                  -- this generates a pulse on the
                                                        clock following CADS
            next_nreset_trig = B"0";                    -- which clears the external trigger flip-flop
        ELSE                                            -- so that it is ready to capture the next event
            next_nreset_trig = B"1";
        end if;
-- *******************
-- TRIG_NOCACHE set cacheability attribute to non-cacheable due to trigger event
        IF ((ext_state[] == 3b_S4)) then                -- set to NON cacheable when in state S4
            next_trig_nocache = B"1";
        ELSIF (ext_state[] == 3b_S5) then               -- Set to NON cacheable when in state S5
            next_trig_nocache = B"1";
        ELSIF (ext_state[] == 3b_S6) then               -- set to NON cacheable when in state S6
            next_trig_nocache = B"1";
        ELSE
            next_trig_nocache = B"0";
        end if;
-- ***************
End;
```

What is claimed is:

1. An apparatus for controlling a cacheability attribute of a central processing unit (CPU) access within an information processing system, said information processing system including a CPU having an internal cache memory and an external memory module which exchanges data with said CPU, and wherein a cacheability attribute is associated with said data and designates said data as cacheable or non-cacheable, said apparatus comprising:

at least one data monitoring unit in communication with said CPU to monitor signals issued and received by said CPU, and wherein said at least one data monitoring unit outputs a trigger signal upon detecting a data operation which is to have said cacheability attribute modified; and a cacheability attribute modify circuit comprising a state machine having at least a cacheable state and a non-cacheable state, said cacheability attribute modify circuit receiving input from said at least one data monitoring unit so that, upon receiving said trigger signal from said at least one data monitoring unit, said cacheability attribute modify circuit modifies said cacheability attribute associated with said data operation, said state machine further including four additional states which are selectively activated when a second memory operation occurs prior to completion of a first memory operation, one of said four additional states being activated in accordance with the cacheability of said first memory operation and the cacheability of said second memory operation, said four additional states comprising:

a first additional state which is active when the first memory operation is cacheable and the second memory operation is also cacheable;

a second additional state which is active when the first memory operation is cacheable and the second memory operation is non-cacheable;

a third additional state which is active when the first memory operation is non-cacheable and the second memory operation is cacheable; and a fourth additional state which is active when the first memory operation is non-cacheable and the second memory operation is non-cacheable.

2. The apparatus as defined in claim 1, wherein said cacheability attribute modify circuit changes said cacheability attribute associated with said data operation so as to designate a cacheable data operation as a non-cacheable data operation upon receipt of said trigger signal.

3. The apparatus as defined in claim 1, further comprising an additional data monitoring unit in communication with said CPU to monitor signals issued by said CPU.

4. The apparatus as defined in claim 1, further comprising an external cache memory in communication with said CPU, said external memory module and said cacheability attribute modify circuit.

5. A system for testing a program in an information processing system, said system comprising:

a central processing unit (CPU) having an internal cache memory:

an external memory module which exchanges data with said CPU said external memory module storing data of said program being tested wherein a cacheability attribute is associated with selected memory locations of said external memory module which store said data and designates said data in said selected memory locations as cacheable or non-cacheable;

a trigger generating circuit which monitors external connections to said CPU to detect data exchanged between said selected memory locations of said external memory module and said CPU and which generates an external trigger signal when said data in said selected memory locations are detected;

a bus controller; and a cacheability attribute modify circuit within said bus controller, said cacheability attribute modify circuit responsive to said external trigger signal to modify said cacheability attribute of said selected memory locations of said memory module to preclude said data in said selected memory locations from being cached in said internal cache memory when said trigger signal is active such that said data exchanged between said selected memory locations and said CPU are transferred on said external pins of said CPU and thereby can be monitored while testing said program.

6. The system for testing a program in an information processing system as defined in claim 5, further comprising a monitoring circuit which monitors data exchanged between said memory module and said CPU for a prespecified characteristic, said monitoring circuit responding to data having said prespecified characteristic to generate said trigger signal.

7. The system for testing a program in an information processing system as defined in claim 6, further comprising an external cache memory in communication with said CPU, said memory module and said cacheability attribute modify circuit.

8. A system for testing a program in an information processing system, said system comprising:

a central processing unit (CPU) having an internal cache memory;

an external memory module which exchanges data with said CPU, said external memory module storing data of said program being tested wherein a cacheability attribute is associated with selected memory locations of said external memory module which store said data and designates said data in said selected memory locations as cacheable or non-cacheable;

a trigger generating circuit which monitors external connections to said CPU to detect data exchanged between said selected memory locations of said external memory module and said CPU and which generates an external trigger signal when said data in said selected memory locations are detected; and a cacheability attribute modify circuit comprising a field programmable gate array (FPGA), said cacheability attribute modify circuit responsive to said external trigger signal to modify said cacheability attribute of said selected memory locations of said memory module to preclude said data in said selected memory locations from being cached in said internal cache memory when said trigger signal is active such that said data exchanged between said selected memory locations and said CPU are transferred on said external pins of said CPU and thereby can be monitored while testing said program.

* * * * *